US012235117B2

(12) United States Patent
Martin et al.

(10) Patent No.: US 12,235,117 B2
(45) Date of Patent: Feb. 25, 2025

(54) SYSTEMS AND METHODS FOR WATER GENERATION ESTIMATION

(71) Applicant: Ford Global Technologies, LLC, Dearborn, MI (US)

(72) Inventors: Douglas Raymond Martin, Canton, MI (US); James George Gebbie, Rochester Hills, MI (US); Robert D. Bedard, Allen Park, MI (US); John P. Casci, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 154 days.

(21) Appl. No.: 17/865,978

(22) Filed: Jul. 15, 2022

(65) Prior Publication Data

US 2024/0019256 A1    Jan. 18, 2024

(51) Int. Cl.
*G01C 21/34* (2006.01)
*B01D 53/26* (2006.01)
(Continued)

(52) U.S. Cl.
CPC ....... *G01C 21/3461* (2013.01); *B01D 53/265* (2013.01); *G01C 21/3415* (2013.01);
(Continued)

(58) Field of Classification Search
CPC ............ G01C 21/3461; G01C 21/3415; G01C 21/3453; G01C 21/3626; G01C 21/3807; B01D 53/265; G01W 1/02; E03B 3/28
See application file for complete search history.

(56) References Cited

U.S. PATENT DOCUMENTS 10,480,163 B2    11/2019  Dudar et al.
10,844,774 B2    11/2020  Martin et al.
(Continued)

FOREIGN PATENT DOCUMENTS

DE    102018120376 A1    2/2020
EP        3927905 A1    12/2021

OTHER PUBLICATIONS

Jiang, Landu, et al; "SunChase: Energy-Efficient Route Planning for Solar-Powered EVs" IEEE 37th International Conference on Distributed Computing Systems (Year: 2017).*
(Continued)

*Primary Examiner* — Joan T Goodbody
*Assistant Examiner* — Godfrey Aleksander Maciorowski
(74) *Attorney, Agent, or Firm* — Vichit Chea; Price Heneveld LLP (57) ABSTRACT

A system for a water generation apparatus of a vehicle includes a sensing device that detects an environmental condition of a geographical area associated with the vehicle. A display device is configured to present a depiction of the geographical area. A controller is in communication with the sensing device and the display device. The controller is configured to determine at least one water generation estimate for the water generation apparatus based on the environmental condition and the geographical area. The controller is further configured to generate a modified representation of the geographical area based on the at least one water generation estimate and the depiction of the geographical area. The controller is further configured to communicate an instruction to present the modified representation at the display device.

14 Claims, 9 Drawing Sheets

(51) Int. Cl.
  *G01C 21/00*  (2006.01)
  *G01C 21/36*  (2006.01)
  *G01W 1/02*  (2006.01)
  *E03B 3/28*  (2006.01)

(52) U.S. Cl.
  CPC ..... *G01C 21/3453* (2013.01); *G01C 21/3626* (2013.01); *G01C 21/3807* (2020.08); *G01W 1/02* (2013.01); *E03B 3/28* (2013.01)

(56) References Cited

U.S. PATENT DOCUMENTS

| | | |
|---|---|---|
| 10,913,414 B2 | 2/2021 | Martin et al. |
| 2012/0035897 A1* | 2/2012 | Bell .................. G09B 29/12 |
| | | 703/2 |
| 2012/0221198 A1* | 8/2012 | Kohavi .............. B60H 1/00849 |
| | | 62/318 |
| 2016/0061617 A1* | 3/2016 | Duggan ............ G06F 16/24578 |
| | | 701/538 |
| 2016/0083936 A1 | 3/2016 | Martin et al. |
| 2017/0219374 A1* | 8/2017 | Sitarski .................. G01C 21/34 |
| 2018/0094593 A1* | 4/2018 | Leone .................. F02M 25/025 |
| 2019/0217975 A1 | 7/2019 | Casci et al. |
| 2019/0301877 A1* | 10/2019 | Duale ................ G01C 21/3484 |
| 2019/0367346 A1 | 12/2019 | Casci et al. |
| 2021/0131817 A1 | 5/2021 | Nakamura |
| 2022/0009313 A1 | 1/2022 | Lipperheide et al. |

OTHER PUBLICATIONS

Further with Ford: a water dispenser in the car might quench your thirst—FutureCar, The date of this non-patent literature is Sep. 2016.

* cited by examiner

SYSTEMS AND METHODS FOR WATER GENERATION ESTIMATION

FIELD OF THE DISCLOSURE

The present disclosure generally relates to a vehicle that generates liquid water for consumption by an occupant, and more particularly, to a system that estimates and communicates water generation capabilities for a vehicle.

BACKGROUND OF THE DISCLOSURE

A vehicle can generate water that is intended for consumption by an occupant. However, the ability to generate water in vehicles can vary widely depending on environmental conditions. Accurate predictions of water generation capabilities and useful communication of these predictions may be challenging to execute.

SUMMARY OF THE DISCLOSURE

According to a first aspect of the present disclosure, a system for a water generation apparatus of a vehicle includes a sensing device that detects an environmental condition of a geographical area associated with the vehicle. A display device is configured to present a depiction of the geographical area. A controller is in communication with the sensing device and the display device. The controller is configured to determine at least one water generation estimate for the water generation apparatus based on the environmental condition and the geographical area. The controller is further configured to generate a modified representation of the geographical area based on the at least one water generation estimate and the depiction of the geographical area. The controller is further configured to communicate an instruction to present the modified representation at the display device.

Embodiments of the first aspect of the invention can include any one or a combination of the following features:
- the modified representation includes a map and a graphical overlay indicating the at least one water generation estimate;
- the at least one water generation estimate includes a plurality of water generation estimates corresponding to a plurality of regions of the geographical area, and wherein the graphical overlay is segmented based on the plurality of regions;
- the graphical overlay includes a color distribution having a first color associated with a low water rate estimate and a second color associated with a high water generation rate;
- the at least one water generation estimate includes a plurality of water generation estimates corresponding to a plurality of routes between a starting location of the vehicle and a destination location of the vehicle, the controller being further configured to rank the plurality of routes based on the plurality of water generation estimates;
- ranking the plurality of routes is further based on a user-defined target water generation level;
- the controller is further configured to communicate an instruction to present at the display device the plurality of routes with an indication of priority for each of the plurality of routes based on the plurality of water generation estimates;
- at least one sensor that detects a capacity level of the water generation apparatus, the capacity level being one of a water generation rate and a water volume;
- the controller is in communication with the at least one sensor and is configured to update the at least one water generation estimate based on the capacity level;
- the controller is further configured to modify a selected route between a starting point of the vehicle and a destination point of the vehicle in response to updating the at least one water generation estimate;
- the at least one water generation estimate includes an estimation of a future water generation capability based on forecasted weather patterns;
- the at least one water generation estimate is at least one of a volume of water and a rate of water collection;
- the display device is one of a user interface for a mobile device and an on-board vehicle display; and
- the controller is further configured to control a driving device of the water generation apparatus in response to a difference between a target water generation level and the at least one water generation estimate.

According to a second aspect of the present disclosure, a method for operating a water generation apparatus of a vehicle includes detecting an environmental condition of a geographical area associated with the vehicle via a sensing device. The method further includes presenting a depiction of the geographical area at a display device. The method further includes, at a controller in communication with the sensing device and the display device, determining at least one water generation estimate for the water generation apparatus based on the environmental condition and the geographical area, generating a modified representation of the geographical area based on the at least one water generation estimate and the depiction of the geographical area, and communicating an instruction to present the modified representation at the display device.

Embodiments of the second aspect of the present disclosure can include any one or a combination of the following features:
- the method further includes detecting a capacity level of the water generation apparatus via at least one sensor, the capacity level being one of a water generation rate and a water volume;
- the method further includes, at the controller, modifying a selected route between a starting point of the vehicle and a destination point of the vehicle in response to updating the at least one water generation estimate; and
- controlling a driving device of the water generation apparatus in response to a difference between a user-defined target water generation level and the at least one water generation estimate.

According to a third aspect of the present disclosure, a system for tracking water generation of a vehicle includes a water generation apparatus disposed in the vehicle and configured to produce liquid water. A sensing device detects an environmental condition of a geographical area associated with the vehicle. A display device is configured to present a depiction of the geographical area. A controller is in communication with the sensing device and the display device. The controller is configured to determine at least one water generation estimate for the water generation apparatus based on the environmental condition and the geographical area. The controller is further configured to generate a modified representation of the geographical area based on the at least one water generation estimate and the depiction of the geographical area. The controller is further configured to communicate an instruction to present the modified representation at the display device.

Embodiments of the third aspect of the present disclosure can include the following feature:

the modified representation includes a map and a graphical overlay indicating the at least one water generation estimate, wherein the at least one water generation estimate includes a plurality of water generation estimates corresponding to a plurality of regions of the geographical area, and wherein the graphical overlay is segmented based on the plurality of regions.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
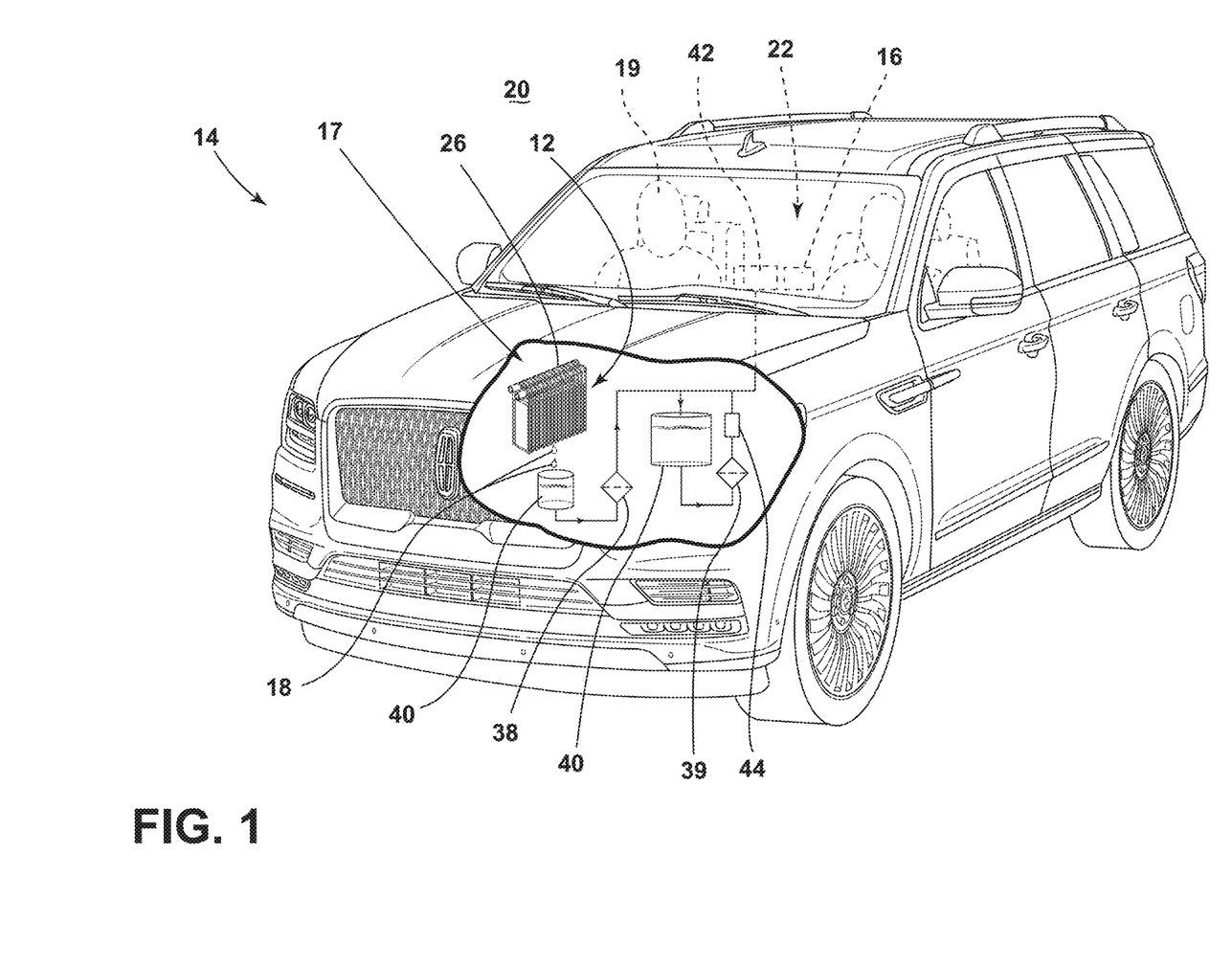
FIG. 1 is a front perspective view of a vehicle incorporating a water generation apparatus of the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The presently illustrated embodiments reside primarily in combinations of method steps and apparatus components related to water generation estimation. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring generally to the figures, the disclosure provides for an estimation and communication system 10 for a water generation apparatus 12 of a vehicle 14. The system 10 may include one or more prediction algorithms that, when executed, may provide accurate estimations of how much water the water generation apparatus 12 may produce over a period of time based on a location or region of the vehicle 14 and/or environmental conditions of the area or region.

For example, the system 10 may model geographic regions based on known weather patterns, altitudes, humidity, and the like to provide an enhanced prediction of a rate of water generation or amount of water to be generated along a trip for the vehicle 14. The system 10 may also produce broader region estimates in areas surrounding a local region in which the vehicle 14 resides. As will further be described herein, the system 10 may also be operable to present the estimations on a display 16 associated with the vehicle 14 (e.g., an onboard human-machine interface (HMI), a display of a smartphone associated with an occupant, etc.). The estimation, or the estimation data, may be presented in a number of ways further described in detail herein but is generally displayed in such a way as to provide the user information indicating what areas may be likely to produce a high or a low rate of water generation. In other examples described further herein, the water generation apparatus 12 may interact with a GPS system or other navigational system to receive travel data, such as beginning and target locations, travel route information, and the like, and the system may employ the travel data to determine expected water accumulation data along a given route or along several routes between two points.

Figure 2:
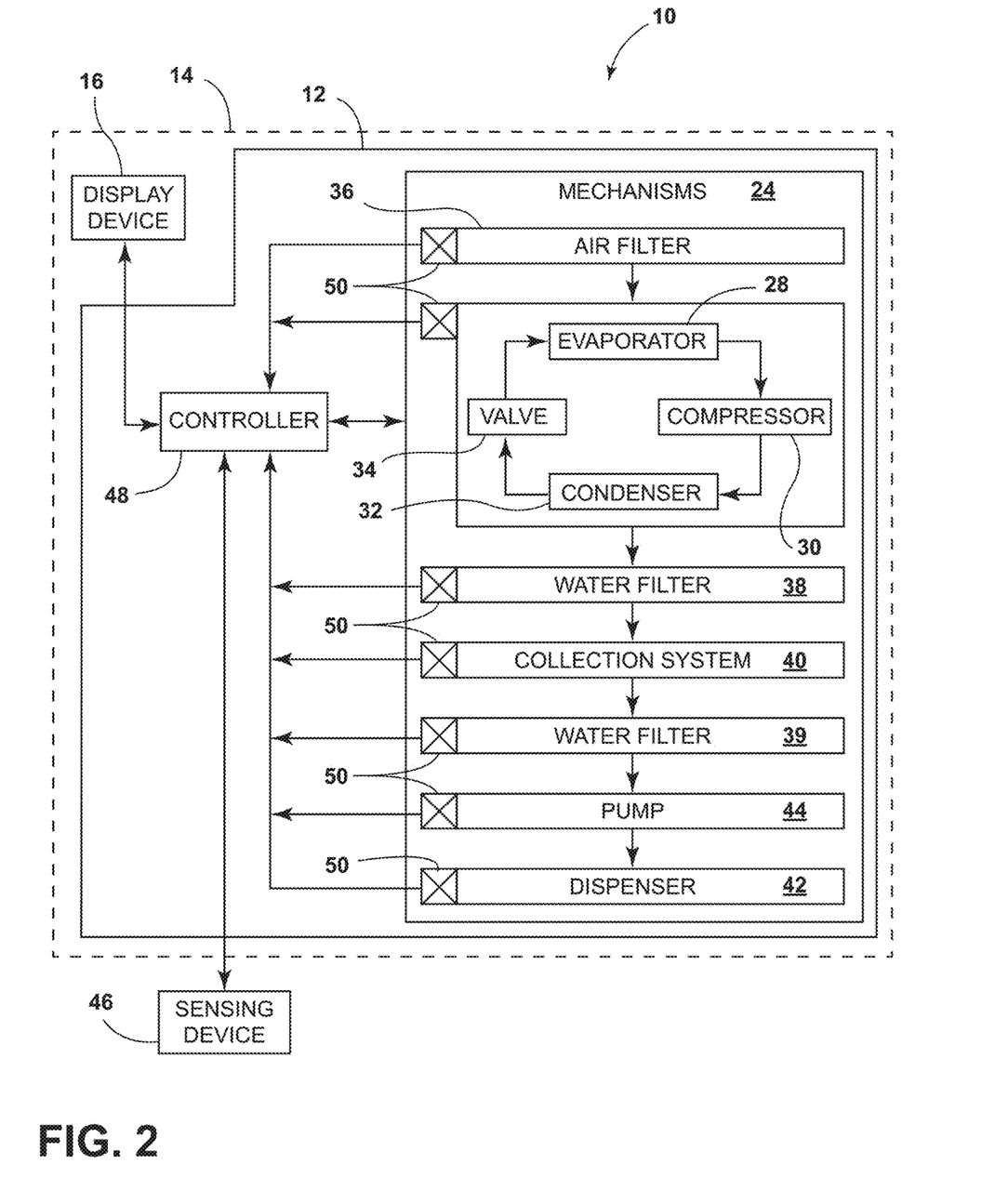
FIG. 2 is a block diagram of a water generation system according to one aspect of the present disclosure.

Referring now to FIGS. 1 and 2, the water generation apparatus 12 may be provided in a compartment 17, such as a rear trunk, a front trunk (as illustrated), or elsewhere within the vehicle 14. The water generation apparatus 12 condenses water vapor from air into liquid water 18 for use by an occupant 19 of the vehicle 14. The air may be drawn from an environment external to the vehicle 14 (e.g., an exterior 20) or from an environment interior of the vehicle 14 (e.g., an interior 22). The water generation apparatus 12 may include a plurality of mechanisms 24 that are operable to collect, filter, sanitize, and pressurize water to allow the water to be dispensed within the interior 22 of the vehicle 14 by the occupant 19. It is contemplated that the vehicle 14 may be manually operated via the occupant 19 or may be operated autonomously or semi-autonomously. The vehicle 14 can be a car, truck, van, sport utility vehicle, airplane, train car, or any other type of vehicle.

Still referring to FIGS. 1 and 2, the water generation apparatus 12 may include a water extraction unit 26 that is in fluid communication with the air. The water extraction unit 26 may include an evaporator 28, a compressor 30, a condenser 32, and an expansion valve 34. In general, the water extraction unit 26 may employ a refrigeration or dehumidification cycle to cause water vapor in the air to condense. For example, the water extraction unit 26 may draw air into the water generation apparatus 12 actively via an intake fan (not illustrated) or passively. It is contemplated that the vehicle 14 moving at a rate of speed may increase the passive intake of air. The liquid water 18 is accumulated by the water extraction unit 26 via the refrigeration cycle of a refrigerant that is provided to the evaporator 28. Air taken from the interior 22 or the exterior 20 flows over the evaporator 28 and water vapor from the air condenses on the evaporator 28 due to the refrigerant having a relatively low temperature. The refrigerant achieves a lower temperature due to the other components of the refrigeration cycle, such as the expansion valve 34 that is provided upstream of the evaporator 28 and the condenser 32 that may be downstream of the evaporator 28.

The compressor 30 is provided in the refrigeration cycle for pressurizing the refrigerant to flow through the evaporator 28. The rate at which the compressor 30 runs may correspond to the temperature of the refrigerant, such that running the compressor 30 at higher energy levels causes a lower temperature in the refrigerant and therefore causes a relatively greater amount of water to condense on the evaporator 28. The power level of the compressor 30 may generally be controlled by a driving device, or an electromechanical device, such as an electric motor, configured to run at a speed (e.g., a number of rotations per minute). As will be further described herein, the system 10 for the water generation apparatus 12 may be operable to control the driving device based on user preference, estimated water generation capabilities, and the like.

With continued reference to FIGS. 1 and 2, other mechanisms 24 of the water generation apparatus 12 include an air filter 36 disposed between the interior 22 or exterior 20 and the water extraction unit 26 for filtering particulates and/or undesired pollutants from the air before water is extracted from the air. One or more water filters 38, 39 may be employed downstream of the water extraction unit 26 for filtering pollutants from the liquid water 18. A collection unit 40, such as one or more containers, may also be employed between the water extraction unit 26 and the dispensing unit 42 for collecting the liquid water 18, such as purified water (e.g., after the water filter 39). A pump 44 may also be disposed with the water generation apparatus 12 for pressurizing the liquid water 18 prior to dispensing. It is contemplated that the various mechanics discussed herein may be employed in alternative orders (e.g., downstream vs. upstream) or in any configuration to provide drinking water to the interior 22 of the vehicle 14. The particular configuration illustrated is intended to be a non-limiting example of one way to extract water from the air and create potable or drinkable liquid water 18.

Referring now more particularly to FIG. 2, at least one sensing device 46 may be provided in or around the vehicle 14 for detecting environmental conditions associated with the vehicle 14. For example, the at least one sensing device 46 may include at least one of a temperature sensor, a humidity sensor, a wind speed sensor, a wind direction sensor, a gyroscope, a barometer, an oxygen sensor, a carbon monoxide sensor, a carbon dioxide sensor, a nitrogen sensor, or any other type of sensor that is operable to detect an environmental condition. The at least one sensing device 46 may be disposed in the interior 22 of the vehicle 14 for detecting a local environmental aspect of the vehicle 14 or may be disposed on an outside of the vehicle 14 for detecting an environmental aspect of the exterior 20. It is also contemplated that the at least one sensing device 46 may include a plurality of sensing devices that are communicatively coupled with control circuitry (e.g., a controller 48) of the water generation apparatus 12. The at least one sensing device 46 may also be communicatively coupled with other subsystems of the vehicle 14, as will be further discussed herein in relation to FIG. 3, such as a local heating, ventilation, and air conditioning (HVAC) control unit. For example, a humidity or temperature sensing circuit employed in the exterior 20 or interior 22 for local HVAC control of the interior 22 of the vehicle 14 may be utilized within the water generation system 10. Thus, the system 10 disclosed herein may be in electrical communication with any number of vehicle subsystems. As will further be described, the at least one sensing device 46 may be remote from the vehicle 14, such as at a weather station or other structure, vehicle, or the like that is configured to detect environmental conditions of a geographical area.

The water generation apparatus 12 may also include one or more sensors 50, or detectors, that are operably coupled with the mechanisms 24 of the water generation apparatus 12. The detectors 50 may be in communication with the controller 48 and may be configured to detect one or more aspects of the water generation process. For example, the one or more sensors 50 may include a float sensor disposed in one or more containers of the collection unit 40 for detecting a fill level of the container. The float sensor may be a capacitive or an inductive sensor or may be any other type of sensor that is configured to detect a fill level of the liquid water 18. In general, the detectors 50 may be configured to detect a volume of water generated by the water generation apparatus 12.

The one or more sensors 50 may include a volumetric flow rate sensor which may employ a venturi or another type of flow rate sensor, such as a mass flow rate sensor, to identify a rate at which water is being accumulated in the water generation apparatus 12. For example, the rate sensor may be operably coupled with the water extraction unit 26, or any place between the water extraction unit 26 and the dispenser 42 for tracking a rate at which water (liquid or gas) is accumulated. It is contemplated that some of or all (as shown) of the mechanisms 24 of the water generation apparatus 12 may include at least one type of sensor 50 for detecting aspects related to water generation estimation. In one example, the one or more sensors 50 includes a particulate sensor and/or an end-of-life sensor associated with the water and/or air filters 36, 38, 39 for detecting when a water filter 38, 39 and/or an air filter 36 is blocked and/or a degree to which it is blocked. It is contemplated that other types of sensors 50 not described herein that are relevant to the water generation estimation aspect of the present disclosure may be employed in the water generation apparatus 12.

Still referring to FIG. 2, the display 16 may be provided for presenting information relevant to the water generation apparatus 12. For example, the display 16 may be configured to present water generation estimates pertaining to a rate of water generation and/or a volume of liquid water 18 collected in the one or more containers of the collection unit 40. It is contemplated that the display 16 may be an onboard display device of the vehicle 14 or may be an interface of a mobile device 68, such as a smartphone, tablet, a laptop, or the like, in communication with the vehicle 14 and/or a subsystem of the vehicle 14. The controller 48 may be in communication with the display 16, the mechanisms 24, the at least one sensing device 46, and the one or more sensors 50. As will be described further herein, the controller 48 may be configured to facilitate control over the water generation apparatus 12 based on data from the at least one sensing device 46 and/or the sensors 50, and communicate an instruction to present that data at the display 16.

Figure 3:
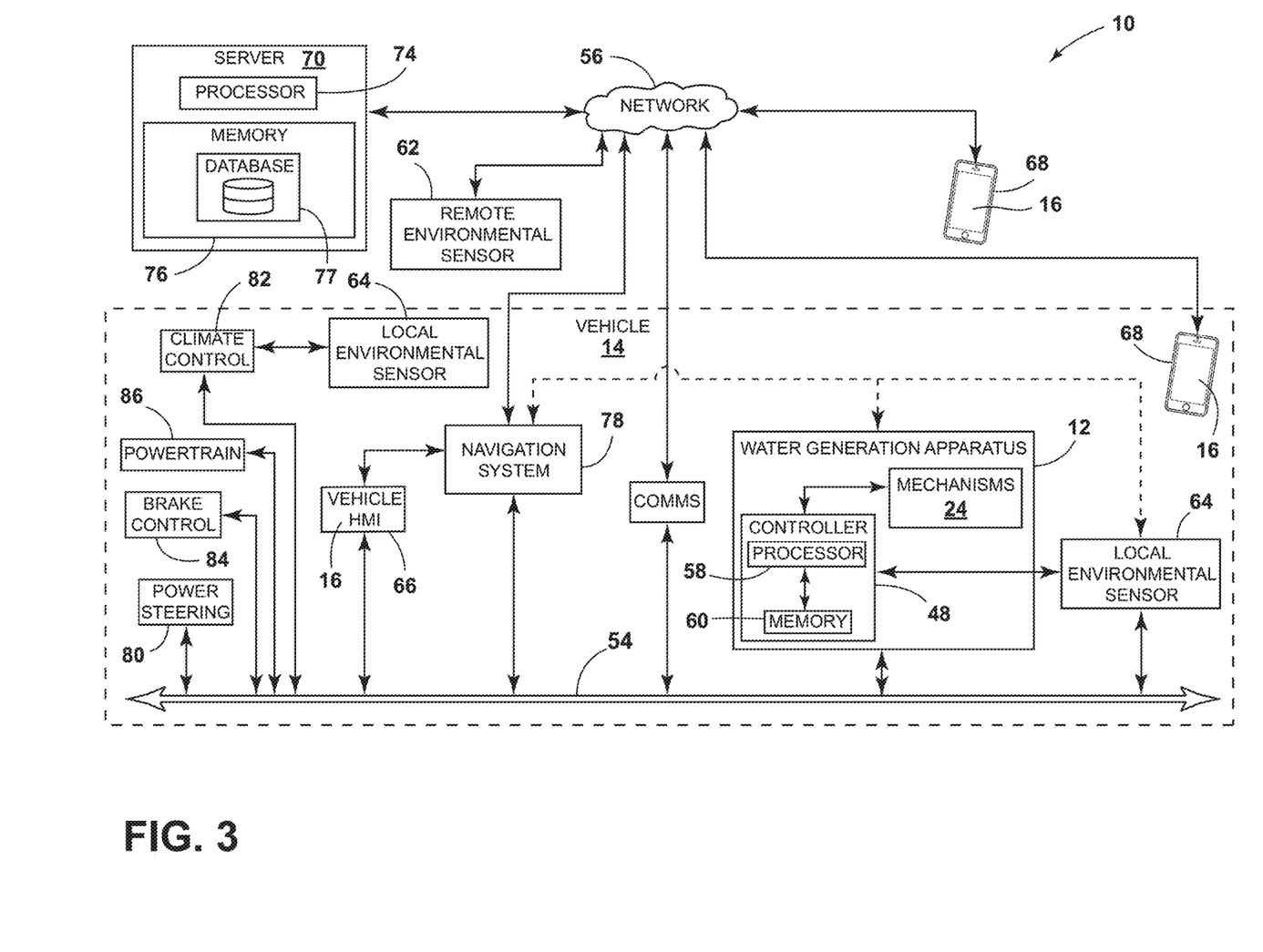
FIG. 3 is a block diagram of a water generation system according to one aspect of the present disclosure.

Referring now to FIG. 3, the system 10 may be employed to interact with various subsystems of the vehicle 14, remote devices, and/or networks associated with the vehicle 14. For example, the controller 48 may be in communication with other subsystems of the vehicle 14 via a vehicle bus 54 and with remote devices via a network 56. For example, the controller 48 may be in communication with other subsystems of the vehicle 14 via the vehicle bus 54 and with remote devices via the network 56. The controller 48 may include a processor 58 and a memory 60 for storing instructions that, when executed by the processor 58, cause the controller 48 to perform functions related to the water generation apparatus 12. For example, the controller 48 may be in communication with the at least one sensing device 46 (e.g., a remote environment sensor 62 or a local environmental sensor 64), be operable to receive water generation information from the at least one sensing device 46, and control the duty cycle of the compressor based on the water generation information. As previously described, the display 16 may be in communication with the controller 48, and the controller 48 may be configured to display water generation apparatus information on the display device 16. As shown in FIG. 3, the display 16 may be an onboard display 66, such as a heads-up display or a touchscreen interface disposed in the interior 22 of the vehicle 14, or may be a remote device, such as the mobile device 68. For example, the display 16 may be an interactive display of a smartphone that is remote from the vehicle 14 or may be the display device 16 of a mobile device 68 disposed within the vehicle 14.

The network 56 may be a restricted network that is associated with an OEM of the vehicle 14 or may be a network configured to communicate with other applications. Generally, the network 56 may be any wired or wireless network that may have access to or comprise part of the Internet. The network 56 may include a plurality of networks or a single network that may be operable to transmit a request to a remote server 70 on the network 56 to receive location or identification information pertaining to the vehicle 14 or a geographical area. The network 56 may be a private or public network and may include a cellular data connection, a Wi-Fi connection, a local area network (LAN) connection, and/or the like. The network 56 may be in communication with a server 70 configured to store data related to environmental conditions in a database. A service provider environment may be in communication with the server 70 and/or the network 56 and may be in communication with the network 56 and include resources related to computer servers, data servers, and network infrastructures such as public or private weather data and patterns, geographical and geological data relevant to climate patterns, and the like. In this way, water generation capabilities over durations of time may be forecasted effectively. According to some aspects, the network 56 may be configured to communicate with the server the mobile devices 68, and/or the vehicle 14 systems (including the water generation apparatus) via Bluetooth, Zigbee, near field communications, global positioning systems, and the like.

The remote server 70 may be configured to process requests and/or transmit information from the server 70 to the water generation apparatus 12, another subsystem of the vehicle 14, or the remote devices 68. For example, the vehicle 14 may include a navigation system 78 that is in communication with the remote server 70 to identify regional geographic information and/or routing information (e.g., roadways between two locations). The server 70 may also or alternatively be configured to process requests from the water generation apparatus 12, for example, to transmit weather information directly to the water generation estimation system 10 to identify geographic areas having high humidity, precipitation, etc.

Referring more particularly to the vehicle 14 subsystems illustrated in FIG. 3, it is contemplated that the vehicle 14 may include a steering system 80, an engine control system, a climate control system 82, an interior arrangement control system, a brake control system 84, a powertrain control system 86, and the like. It is contemplated that the number and types of subsystems may be any type commonly employed in the vehicle 14 for controlling at least one function of the vehicle 14 or monitoring aspects of the vehicle 14. As previously discussed, the vehicle 14 may also include a navigation system 78 that is in communication with the vehicle bus 54 and is configured to receive and/or identify global positioning system (GPS) data and process the GPS data to identify a destination point and/or a starting point. It is contemplated that one or more of the steps of identifying destination target points, and/or travel routes may be provided via the remote server 70 in communication with the navigation system 78. In this way, the navigation system 78 may include at least a portion of the server 70 or another server in some examples. For example, the navigation system 78 may include another or the same remote server 70 illustrated in FIG. 3 to identify routes between the starting point and destination points entered or identified by the navigation system 78.

It is contemplated that the one or more remote servers 70 may be configured to track weather patterns and/or environmental data corresponding to geographic regions. For example, data gathered by weather stations and/or satellite imagery, data collected and shared via an Internet service provider and/or a cloud computing service, computer software, or the like (e.g., Google) may be received by the navigational system and/or the water generation estimation system 10 and processed in order to identify one or more paths between two locations. In addition, the weather data, or environmental data, may be communicated to the display device 16 for overlaying an image of the region (e.g., a map), as will be described herein.

As previously described, the one or more sensing devices 46 may be employed to identify the weather pattern of an environment proximate to the vehicle 14. For example, a humidity level, a temperature, a wind speed, a dew point, a pressure, an altitude, a precipitation, as well as any quality previously described related to an environmental condition may be detected by the at least one sensor local to the vehicle 14 (e.g., the local environmental sensors 64) and provided to the water generation estimation system 10 and/or the navigation system 78. It is contemplated that the navigation system 78 and water generation estimation system 10 may be in communication with the at least one sensing device 46 for processing data from the at least one sensing device 46. In some examples, the navigation system 78 compares the data from the at least one sensing device 46 (e.g., the local environmental sensors 64) to data from the remote server 70 and/or the weather service provider (e.g., from the remote environmental sensors 62). For example, if the environmental tracking system or the weather detection system indicates that it is raining in a particular geographic location, and the sensor data indicates that it is not raining at a position within that particular region, the navigation system 78 may update the estimation of the environmental condition surrounding the vehicle 14 in the region in which the vehicle 14 is in to reflect actual ability to generate water. It is contemplated that the steps performed by the navigation system 78 described herein may also or alternatively be performed by the water generation estimation system 10 (e.g., the controller 48).

In general, the water generation estimation system 10 may be configured to acquire GPS data corresponding to a location, altitude, weather information (e.g., temperature, humidity, dew point, barometric pressure, altitude, etc.) and calculate water generation capability based on this data. For example, the controller 48 may be configured to calculate a water generation rate (e.g., in liters per hour) by employing a lookup table that includes the environmental data. The controller 48 may then be configured to display the water generation capability for the location of the vehicle 14 (and/or a user associated with the vehicle 14) for current or future onboard water generation estimates on at least one screen of the display, as will be described herein.

The controller 48 of the water generation apparatus 12 may also be configured to calculate and communicate instructions to display the water generation capability in various operational modes related to a power level of the water generation apparatus 12 (e.g., low, medium, high). For example, the controller 48 of the water generation apparatus 12 may be configured to run the compressor 30 continuously whenever the containers/reservoir of the collection unit 40 is not full when the water generation apparatus 12 is at maximum power. Similarly, the controller 48 may be configured to communicate an instruction to run the compressor 30 at a 50% duty cycle when the reservoir is not full and whenever excess regen energy is present when to run at a medium power level. Continuing with the example, when the water generation apparatus 12 is in a low, or "ECO," mode the controller 48 may be configured to run the compressor 30 when the reservoir is not full at a 10% duty cycle. Further still, the controller 48 may be configured to run the compressor 30 only when excess regen energy is present or staleness of water is present when the water generation apparatus 12 is in a "Super ECO" mode. It is contemplated that the controller 48 may be configured to track a time during which the liquid water 18 is stored in the reservoir in order to determine and/or identify a staleness of the water in the water generation apparatus 12.

The controller 48 may also be configured to calculate the amount of energy required to run the water generation apparatus 12 over a given period of time and/or over a specific geographical landscape. For example, for a given path between two locations, the controller 48 may be configured to identify how much energy (e.g., in kilowatt-hours) is required to generate a specific amount of water by incorporating the environmental conditions determined by the navigational system and/or the remote servers 70. It is contemplated that, as previously described, the controller 48 of the water generation apparatus 12 may be in communication with the navigation system 78 and/or remote servers 70 that are configured to acquire weather information for a large geographic region to allow the controller 48 to generate a water generation estimation.

Figure 4A:
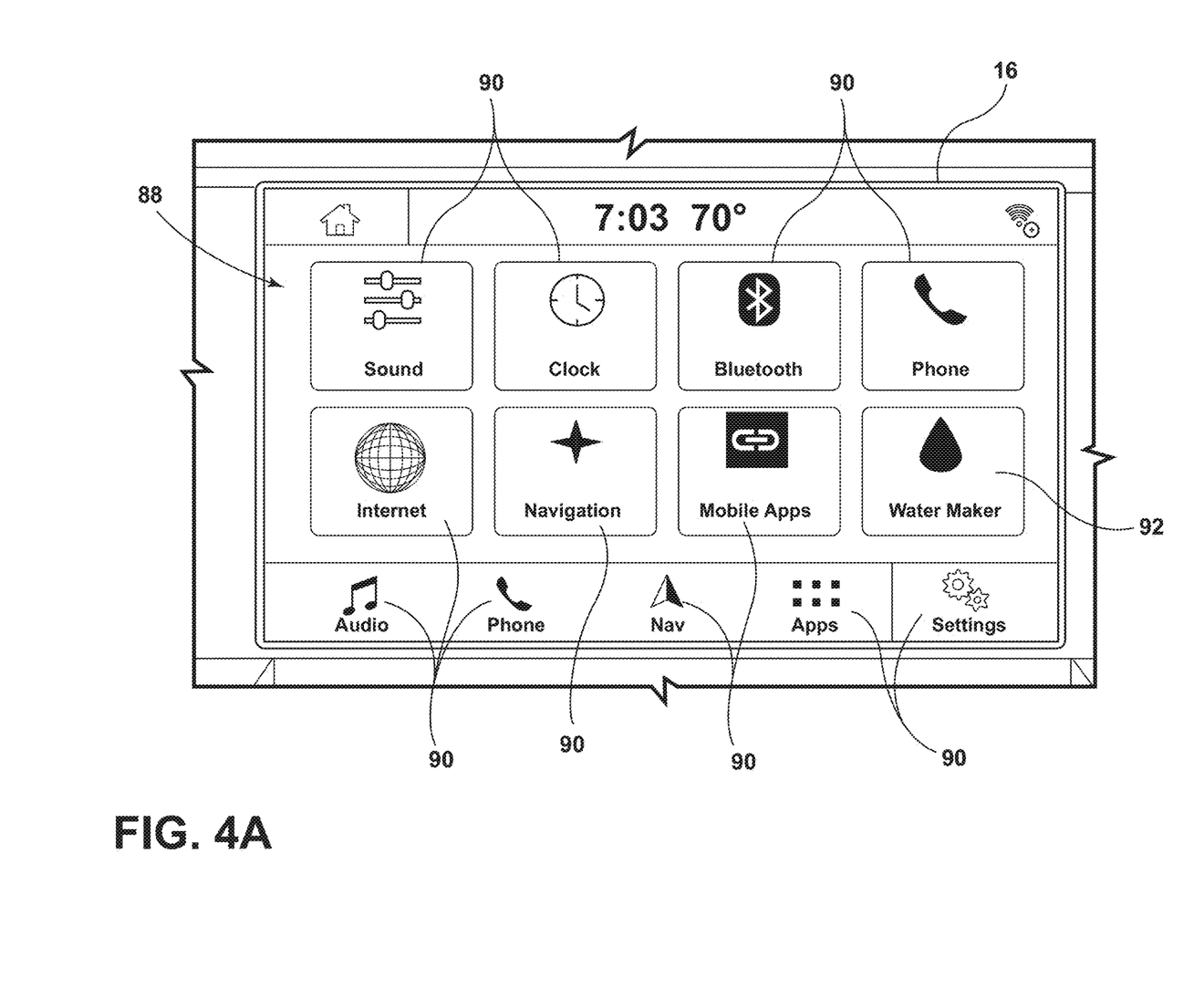
FIG. 4A is a main menu screen of an exemplary display according to one aspect of the present disclosure.

Referring now to FIGS. 4A-4D, various screens of the display device 16 of the water generation estimation system 10 are illustrated incorporating various features for presenting the water generation estimation data. As illustrated in FIG. 4A, a first screen 88 for presenting at the display 16 is illustrated incorporating various functions of a human machine interface of an onboard display device 66 of the vehicle 14. For example, the first screen 88 may be a main menu screen displaying digital buttons 90 for various subsystem operations of the vehicle 14, such as Bluetooth tethering, smartphone connection, volume and audio control, and the like alongside a water generation management object 92 displayed on the main menu screen 88. When the user selects the water generation management button 92 (e.g., "water maker"), one or more operational control screens 94, 96, 98 may be displayed indicating water generation level information.

Figure 4B:
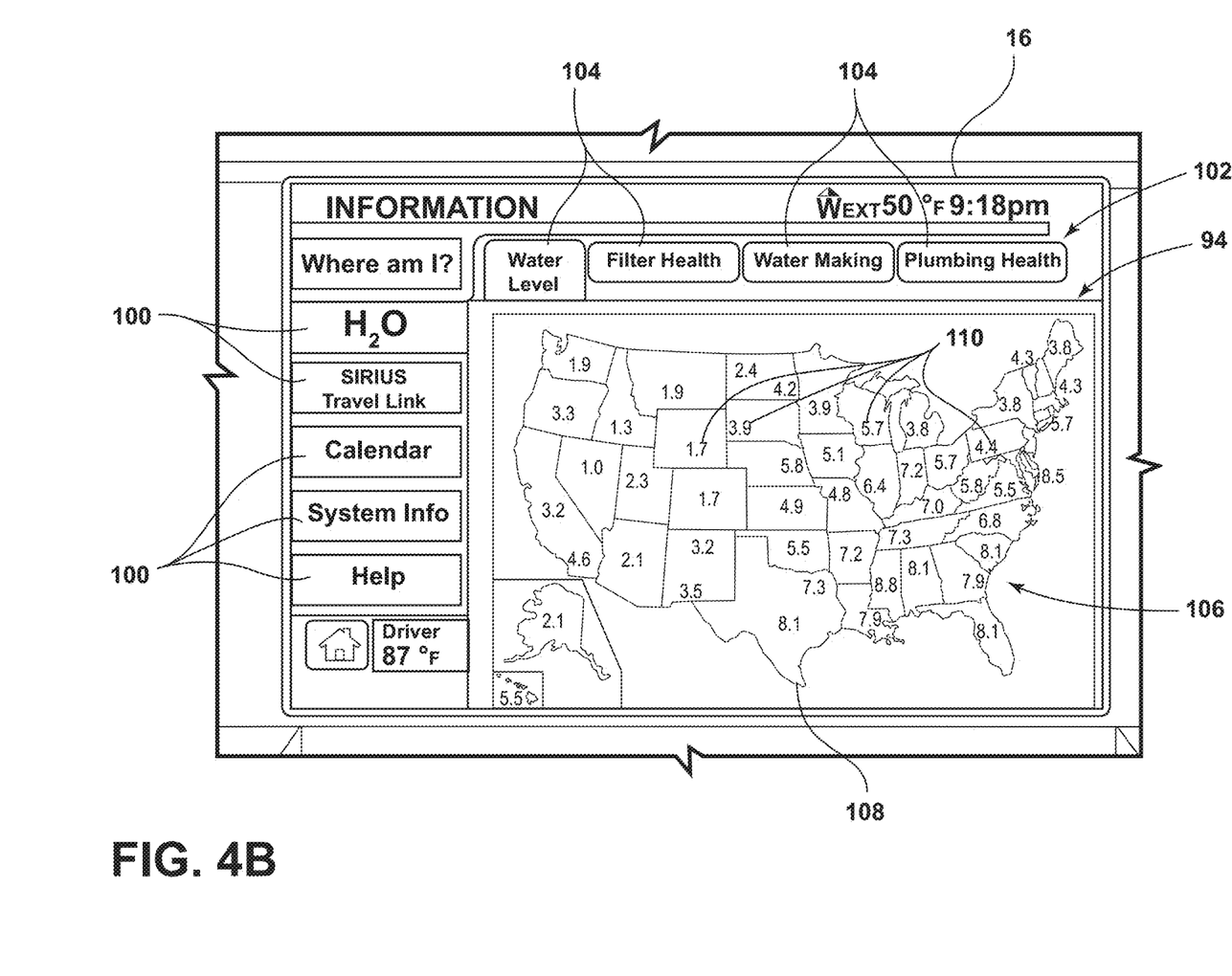
FIG. 4B is an operation screen of an exemplary display according to one aspect of the present disclosure.
Figure 4C:
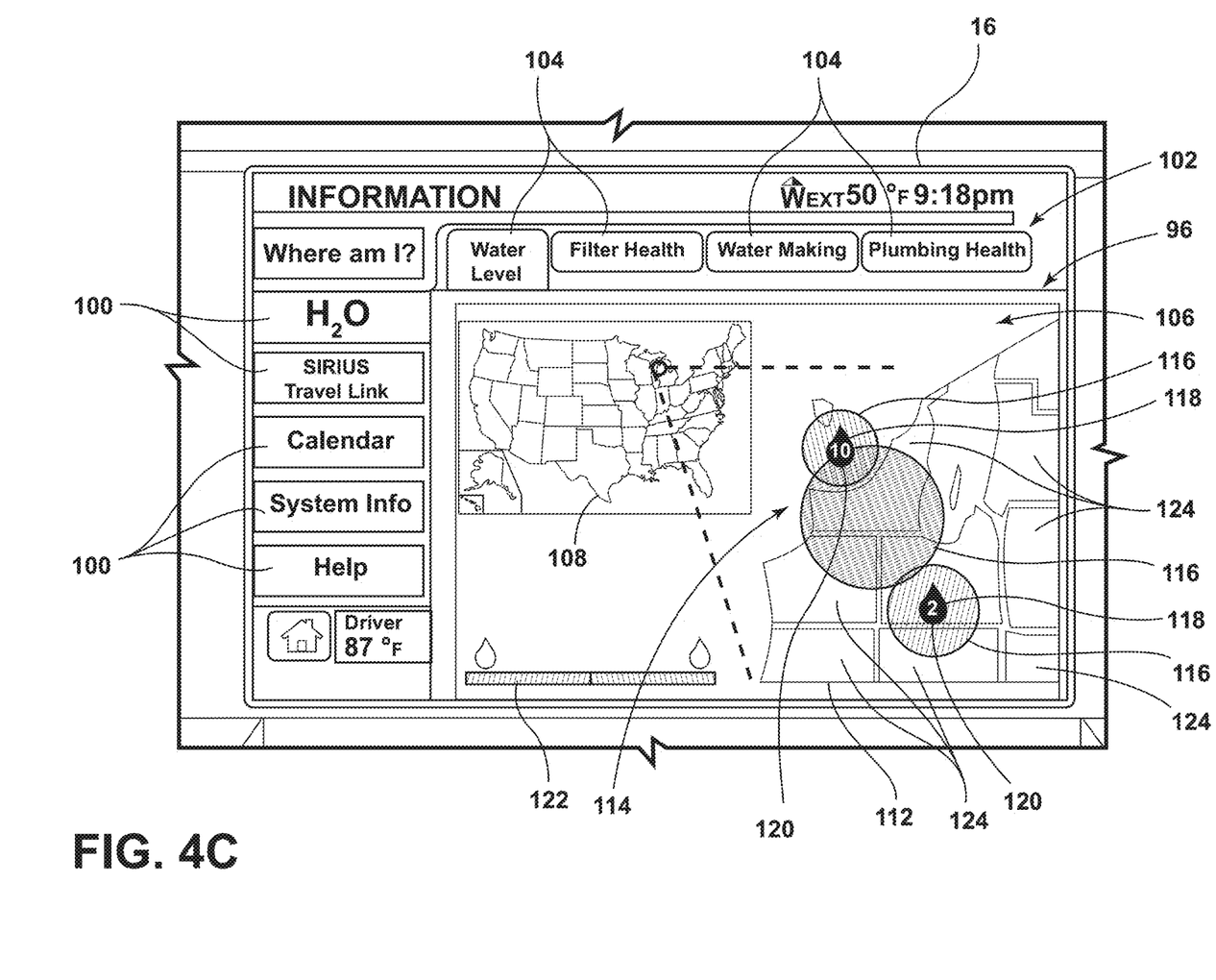
FIG. 4C is an operation screen of an exemplary display according to one aspect of the present disclosure.

Referring now to FIGS. 4B and 4C, the one or more operational screens may include a plurality of navigation buttons 100 disposed along one side of the screen and a submenu region 102 that includes a plurality of submenu buttons 104 that, when activated, are operable to toggle between the one or more operational screens. A geographic display region 106 may occupy a significant part of the operational screens 94, 96, 98 and be configured to display water generation prediction data on a first geographic representation 108 corresponding to a broad geographical area. For example, as illustrated in FIG. 4B, the geographic display region 106 may present a broad geographical region (e.g., the United States) associated with the vehicle 14. For example, if the vehicle 14 has been determined to be located within a state, city, or GPS coordinate within the United States, the first operational screen 94 may display a map of the United States.

One or more indicators 110 may be overlaid over the broad geographical representation 108, indicating an estimated water generation parameter associated with one or more sub-regions of the broad geographical region. The one or more indicators 110 may include at least one of a color, a number, a light pattern, a hue, a text, a text modifier (e.g., bold, underline, italics, text size), or the like. As will be described herein in reference to FIG. 4C, the one or more indicators 110 may be in the form of a shape or size indicating a degree of water generation (e.g., a star associated with a high degree of water generation, and an x associated with a low estimation of water generation, etc.). It is contemplated that the particular indicator displayed on the first operational screen 94 may be the same or different than an indicator displayed on any of the other operational screens 96, 98.

Figure 4D:
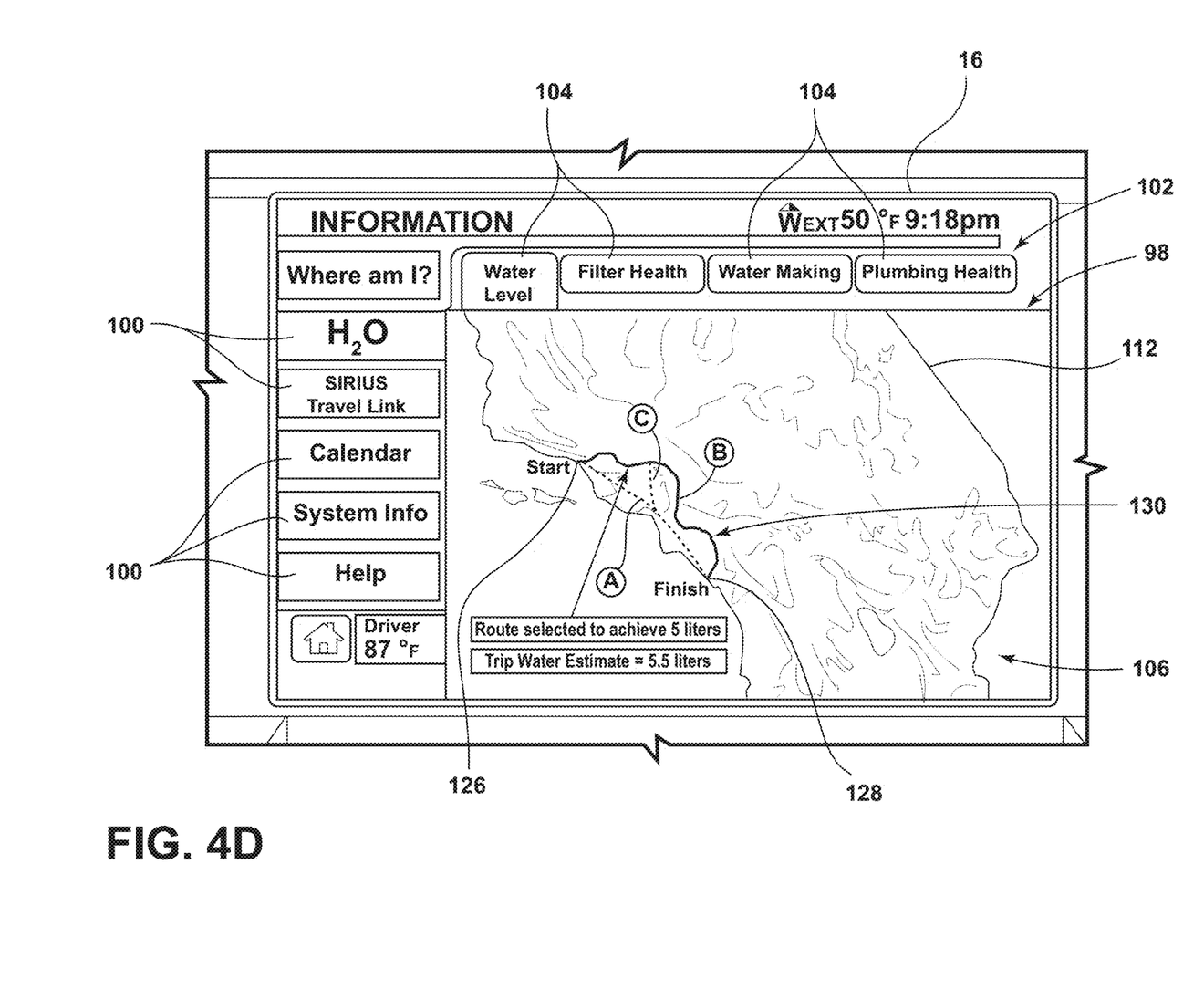
FIG. 4D is an operation screen of an exemplary display according to one aspect of the present disclosure.

Referring generally to the submenu presented on the operational screens shown in FIGS. 4B-4D, although not specifically depicted herein, various parameters of the water generation estimation system 10 may be accessed and presented on one or more of the display devices 16 indicating the health of the water generation apparatus (e.g., a filter usage indicator, an accumulation defect, or the like). For example, the submenu region 102 may provide navigation to other operational screens indicating live feedback of water making and/or historical feedback of water making by the water generation apparatus 12. The submenu region 102 may also include a specific operational screen directed toward one or more levels of filter health associated with the water or air filters 36, 38, 39. Further, the submenu region 102 may include a submenu button 104 that, when activated, causes the display 16 to present a water level associated with the water generation apparatus 12, such as an accumulation level, a rate of accumulation, a rate of water accumulation, and the like.

Referring now to FIG. 4C, the geographic display region 106 may be operable to display a more specific geographic region associated with the location of the vehicle 14 or desired location of the occupant 19. For example, from the first operational screen 94 depicted in FIG. 4B, the user 19 may interact with (e.g., touch) an area on the display 16 associated with a particular part of the geographical area depicted in the first geographic representation 108. A second geographical representation 112 illustrated in FIG. 4C is exemplary and may depict a local region (e.g., a northern region of the state of Michigan, as depicted) that includes a graphical overlay 114 indicating a water generation associated with the area. For example, a plurality of geometric indicators 116 indicating a region associated with high water generation and/or low water generation may be overlaid over the northern region of Michigan representation and include a level of transparency associated with a density or rate of water generation corresponding with the actual region that is overlaid by the one or more geometric indicators 116. In some examples, the graphical overlay 114 is segmented into grid segments based on a plurality of geographical regions with differing water generation estimates. The geographical overlay 114 may include a color distribution having a first color associated with a low water generation estimate and a second color associated with a high water generation estimate.

For example, as shown, the geometric indicator 116 may be a circle. However, it is contemplated that any shape may be considered and that the shape presented may indicate or correspond to a level of high or low water generation. Further, the geometric indicator 116 may include a specific shape (e.g., a teardrop or water droplet 118 shape) disposed within the geometric region and encapsulate the geometric region. It is contemplated that the size of the representative icon (e.g., the water droplet object 118) may be employed to indicate the level of water generation capabilities. A numeric value 120 may also be presented in the geometric indicator 116 to indicate a level of expected water generation in that area. It is also contemplated that a water meter indicia 122 may be presented on one or more of the operational screens 94, 96, 98 to indicate the level of water generation associated with a particular area that the user 19 may identify by interacting with the display device 16. The water meter indicia 122 may be color-coded to reflect a level of expected water generation or to filter particular geographic regions of the first or second geographic representations 108, 112.

Still referring to FIG. 4C, the geographic display region 106 indicating a specific geographic region may include a plurality of areas 124 arranged in a grid pattern overlaying the second geographical representation 112. In some examples, the map of the geographic region (e.g., the geographic display region 106) is displayed in a color-coded configuration based on generation capability. For example, a beige colored grid segment may indicate a low water generation capability, whereas green and blue may be associated with high water generation capabilities based on estimations by the water generation estimation system 10. In this way, the driver of the vehicle 14 or another occupant 19 of the vehicle 14 may know with confidence that the amount of water the system 10 may produce in current or future conditions along a route. In some aspects of the disclosure, the at least one sensing device 46 (described in relation to FIGS. 2 and 3) may include a particulate sensor to detect pollution and environmental air. It is contemplated that the particulate sensor may be remote from the vehicle 14 or disposed on the vehicle 14 to allow detection of areas having polluted air. Similarly, the at least one sensor 50 may be employed to detect areas with clean air. The areas with clean air may be presented at the display 16 and/or the suggested routes as previously described may be determined based on the areas corresponding to clean air. In this way, the water generation estimation system 10 may produce suggested routes in order to increase the life of one or more of the filtration devices of the water generation apparatus 12.

Referring now to FIG. 4D, it is contemplated that the operational screens 94, 96, 98 may also be configured to display navigational data corresponding to a start point 126 and a destination point 128. For example, the start point 126 and the destination point 128 may be received via a navigational system integral with or in communication with the display 16 and/or the water generation estimation system 10. As such, the starting and destination points 126, 128 may be GPS coordinates and/or may be geographical regions identified by another navigational parameter. For example, the navigational system may be configured to identify a starting city or address and a destination city or address. These are merely exemplary configurations, and it is contemplated that any form of navigational input may be displayed with the water generation estimation data.

Still referring to FIG. 4D, a route 130 may be displayed on the third operational screen 98 between the starting and destination points 126, 128. A water generation estimation may be associated with the route 130. For example, an amount of water expected to be generated may be determined and/or a rate of water generation may be determined. It is also contemplated that the third operational screen 98 presented may include alternative routes suggested based on higher projected amounts of water to be generated along a first route versus a second route. For example route A as presented in FIG. 4D may correspond with the shortest distance route and/or the fastest route between the starting point 126 and the destination point 128. Route B may correspond to a path being under a given time (e.g., not necessarily the fastest) but having a water generation level exceeding a threshold identified by the system 10 and/or manually by the user 19. Route C may be predicted by the water generation estimation system 10 to weigh both water generation and speed. In this way, the water generation estimation system 10 may be operable to determine or suggest routes between the starting point 126 and the destination point 128. For example, the controller 48 may be configured to rank a plurality of routes (e.g., route A, route B, and route C) based on a plurality of corresponding water generation estimates. The ranking may be displayed to indicate priority for each of the routes based on the water generation estimates.

It is also contemplated that the system 10 may identify a minimum for the water generation level threshold based on the length of the trip, the size of the vehicle 14, the number of occupants associated with the trip, and the like. For example, the water generation estimation system 10 may identify a minimum threshold of 5 L of water over a 20 hour trip through the desert or an aerated climate where the water generation estimate is relatively low. In addition, or alternatively, the system 10 may predict future weather patterns or forecasts to estimate future water production rates, quantities, efficiency, capability, or the like over time or over a duration of the trip (e.g., the 20 hour trip). In this way, water generation estimation system 10 may be configured to optimize the trip between the starting point 126 and the destination point 128 based on the level of water generation, the expected duration for the trip, and the like.

It is contemplated that the water generation estimation system 10 may provide active estimations during a trip along a selected route, such that the system 10 may solely or in tandem with the navigation system 78 suggest reroutes based on actual generation of water. For example, if the system 10 estimates that 5 L of water will be gathered between the starting point 126 and an intermediate point between the starting point 126 and the destination point 128, the water generation estimation system 10 may suggest an alternate route if the amount of water is not reached when the vehicle 14 reaches the intermediate point. For example, if the system 10 has only generated 4 L of water at the intermediate point (as detected via one or more of the sensors 50), when it was expected to have generated 5 L of water at the intermediate point, the water generation estimation system 10 may update the estimation process, via, e.g., a machine learning algorithm, and/or suggest an alternative route between the intermediate point of the destination point 128 based on one of the prescribed methods described above. Additionally, or alternatively, the controller 48 may modify a selected route in response to an update to the water generation estimate for an area. Further, the controller 48 may communicate an instruction or signal to a driving device (e.g., the motor of the compressor 30) to increase or decrease a power level of the drive device to increase or decrease water generation in response to a difference between a target water generation level and actual accumulation or estimated accumulation. In this way, the water generation apparatus 12 may be employed during a trip to enhance water generation capabilities.

As previously described, the controller 48 may be configured to update the algorithm or the instructions stored in the memory 60 (or the server 70) to incorporate feedback based on known trips taken along similar paths. For example, if the occupant 19 of the vehicle 14, or the user of the vehicle 14, travels a similar route and a scheduled routine or predictive routine, the water generation estimation system 10 may continuously update the water generation estimation based on the actual water generated during trips between two points. In this way, the controller 48 may employ machine learning models that actively adjust the water generation estimation based on the feedback. The machine learning models may further be employed to adjust estimations of water generation capabilities outside of the predicted travel routes in order to create a more robust algorithm in other regions.

In some examples, at least the controller (e.g., controller 48) may calculate the water generation capability for each grid segment (e.g., area 124) of the geographic region. For example, the controller 48 may employ an algorithm that, when executed, causes the controller 48 to calculate an amount of water estimated to be generated in liters per hour for each area 124. The algorithm may incorporate a formula to generate the liters per hour calculation, the formula being a product of water content in air volume at a given temperature, an efficiency, capability, or capacity of water removal based on the parameters of the water generation apparatus 12 (e.g., a capacity level), and the local absolute pressure. It is contemplated that the product of these three parameters may be scaled (e.g., proportioned) by a constant such as 1/29.92, which may correspond to a number of inches of mercury at a static pressure. The removal capacity may refer to a ratio of energy to volume (e.g., kWh/L), a water generation rate (L/h), or any other rate or quantity for gauging an estimation of water generation capability/capacity. The capacity may be anywhere between zero and 100%, but in the example illustrated in FIG. 5, may exemplarily be 50%. In general, because the amount of water in the air may be dependent on temperature, pressure, humidity, and like, the estimation may incorporate these parameters as described herein. In general, the algorithm executed by the controller 48 may incorporate the water generation capability at sea level and adjust the water generation capability from the sea level estimation to the estimation associated with a given grid segment.

Figure 5:
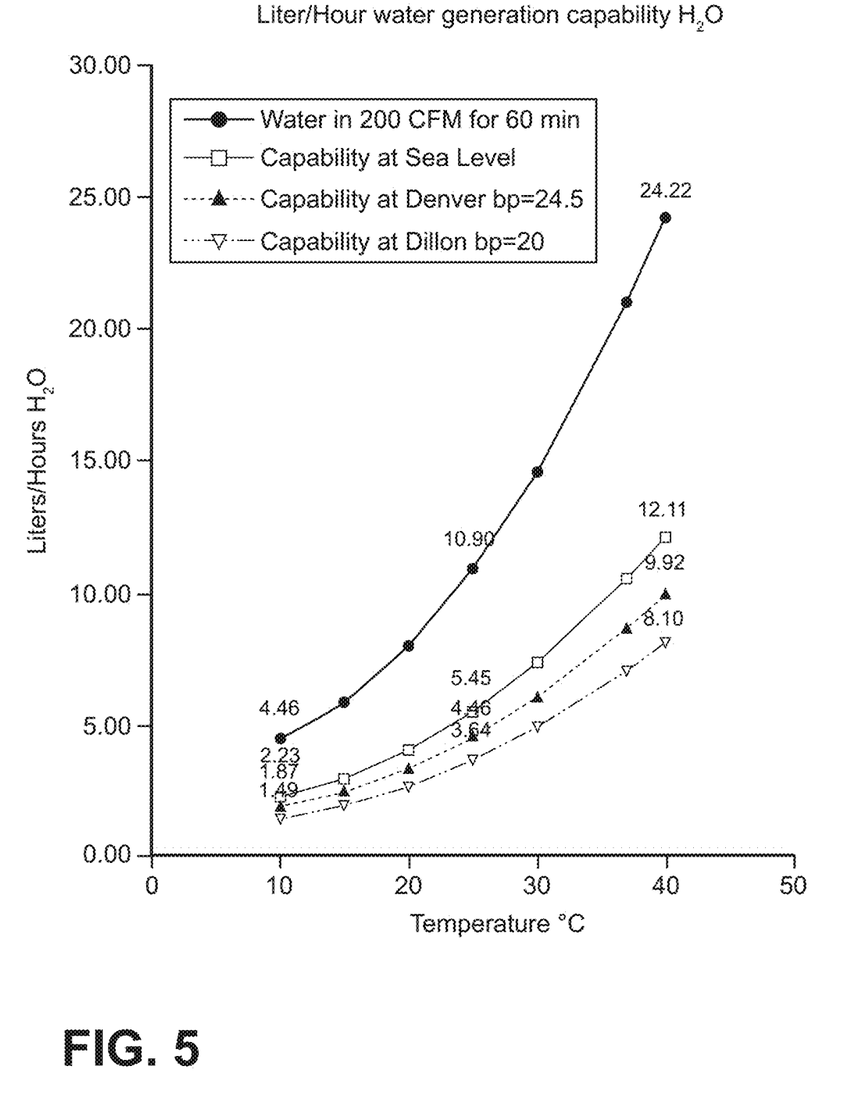
FIG. 5 is a plot of water generation estimates across several geographic locations based on temperature.

For example, as illustrated in FIG. 5, the controller 48 may be configured to calculate a generation capability at a geographic region, such as the city of Denver, Colorado. In this example, the barometric pressure associated with Denver, Colorado is 24.5 inches of mercury. Accordingly, the water generation capabilities at Denver may be lower than the generation capability for given temperatures at sea level. Similarly, water generation capabilities (or estimates thereof) in another city (e.g., Dillon) may be lower than those of Denver due to a lower barometric pressure estimate of 20 inches of mercury units. It is contemplated that, without factoring in pressure parameters, the water generation estimation for 60 minutes of air moving at 200 ft. 3 per minute may be in the range of between 4 and 25 L per hour depending on the temperature. The graph illustrated in FIG. 5 is intended to be exemplary and non-limiting, but generally illustrates the relationship between temperature and pressure and how the control scheme may incorporate the temperature, pressure, and the like to estimate water generation capability. For example, other environmental qualities previously described may affect the water generation estimation.

Figure 6:
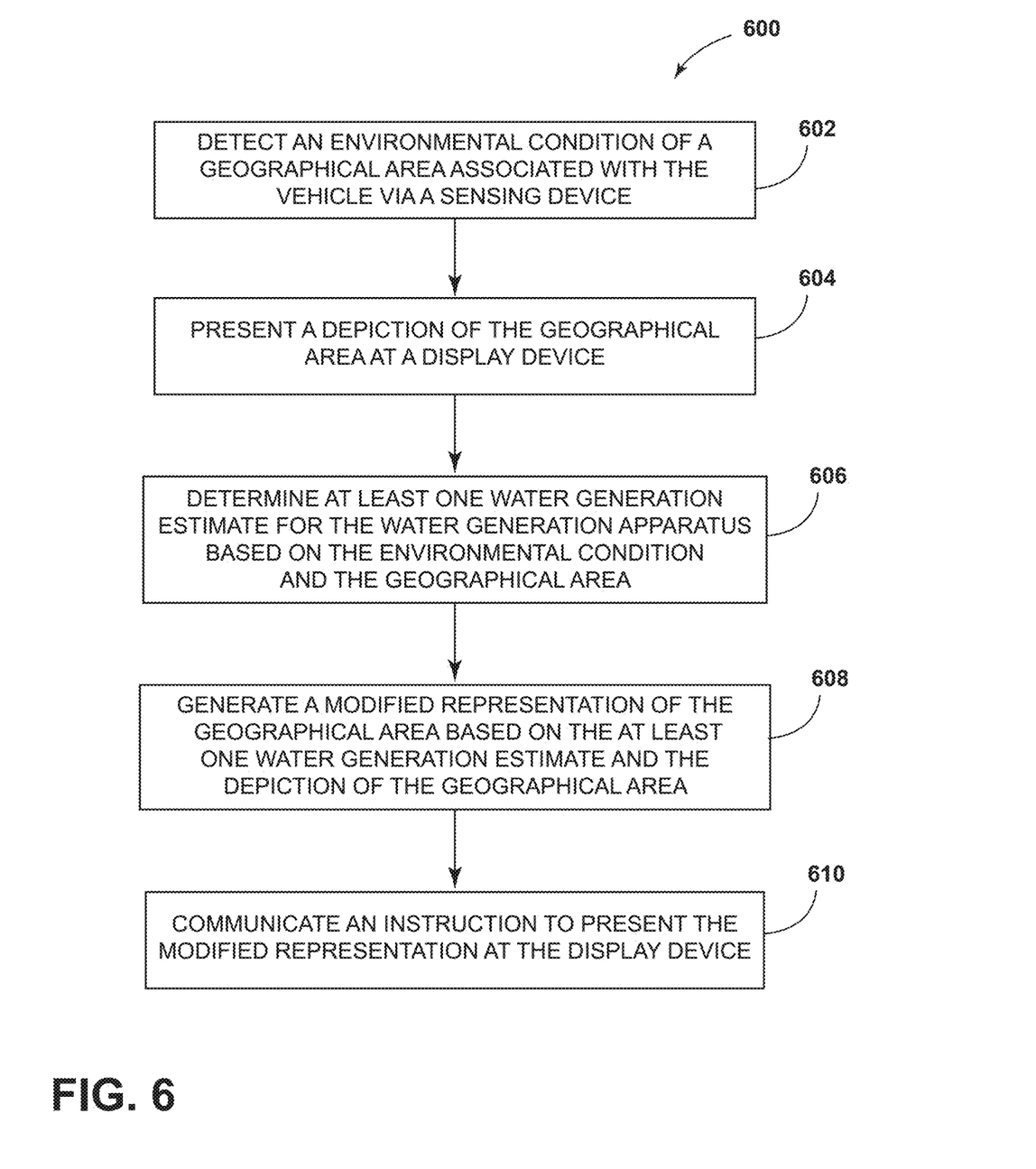
FIG. 6 is a method for operating a water generation apparatus of a vehicle assembly according to one aspect of the present disclosure.

Referring now to FIG. 6, an exemplary method 600 for operating the water generation apparatus 12 of the vehicle 14 is depicted. The method 600 may include detecting an environmental condition of the geographical area associated with the vehicle 14 via the sensing device 46 (e.g., a humidity sensor, a temperature sensor, or the like) at step 602. At step 604, the method 600 may present a depiction of the geographical area at the display device 16. For example, the depiction of the method 600 may present the depiction of northern Michigan as illustrated in FIG. 4C at the onboard display 66. It is contemplated as previously described that the display 16 may be on the mobile device 68 as well or in an alternative. At step 606, the method 600 includes determining at least one water generation estimate for the water generation apparatus 12 based on the environmental condition in the geographic area. At step 608, the method 600 may generate a modified representation of the geographical area based on the at least one water generation estimate and the depiction of the geographical area. At step 610, the method 600 may communicate an instruction to present the modified representation at the display device 16. It is contemplated that steps 606-610 may be performed on at least one controller previously described (e.g., controller 48, a controller of the server 70, a controller of the navigation system 78, etc.) in communication with the sensing device 46 and the display device 16.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A system for a water generation apparatus of a vehicle, the system comprising:
   a sensing device that detects an environmental condition of a geographical area associated with the vehicle;
   a display device configured to present a depiction of the geographical area;
   at least one sensor that detects a capacity level of the water generation apparatus, the capacity level being one of a water generation rate and a water volume; and
   a controller in communication with the sensing device, the at least one sensor, and the display device, the controller configured to:
   determine at least one water generation estimate for the water generation apparatus based on the environmental condition and the geographical area;
   update the at least one water generation estimate based on the capacity level during a trip along a selected route;
   modify the selected route between a starting point of the vehicle and a destination point of the vehicle in response to updating the at least one water generation estimate during the trip;
   generate a modified representation of the geographical area based on the at least one water generation estimate and the depiction of the geographical area; and
   communicate an instruction to present the modified representation at the display device.

2. The system of claim 1, wherein the modified representation includes a map and a graphical overlay indicating the at least one water generation estimate.

3. The system of claim 2, wherein the at least one water generation estimate includes a plurality of water generation estimates corresponding to a plurality of regions of the geographical area, and wherein the graphical overlay is segmented based on the plurality of regions.

4. The system of claim 3, wherein the graphical overlay includes a color distribution having a first color associated with a low water generation rate and a second color associated with a high water generation rate.

5. The system of claim 1, wherein the at least one water generation estimate includes a plurality of water generation estimates corresponding to a plurality of routes between a starting location of the vehicle and a destination location of the vehicle, and wherein the controller is further configured to rank the plurality of routes based on the plurality of water generation estimates.

6. The system of claim 5, wherein ranking the plurality of routes is further based on a user-defined target water generation level.

7. The system of claim 5, wherein the controller is further configured to communicate an instruction to present at the display device the plurality of routes with an indication of priority for each of the plurality of routes based on the plurality of water generation estimates.

8. The system of claim 1, wherein the at least one water generation estimate includes an estimation of a future water generation capability based on forecasted weather patterns.

9. The system of claim 1, wherein the at least one water generation estimate is at least one of a volume of water and a rate of water collection.

10. The system of claim 1, wherein the display device is one of a user interface for a mobile device and an on-board vehicle display.

11. The system of claim 1, wherein the controller is further configured to control a driving device of the water generation apparatus in response to a difference between a target water generation level and the at least one water generation estimate.

12. A method for operating a water generation apparatus of a vehicle, the method comprising:
   detecting an environmental condition of a geographical area associated with the vehicle via a sensing device;
   presenting a depiction of the geographical area at a display device; and
   at a controller in communication with the sensing device and the display device:
   determining at least one water generation estimate for the water generation apparatus based on the environmental condition and the geographical area, detecting a capacity level of the water generation apparatus via at least one sensor, the capacity level being one of a water generation rate and a water volume, updating the at least one water generation estimate based on the capacity level during a trip along a selected route, automatically modifying the selected route between a starting point of the vehicle and a destination point of the vehicle in response to updating the at least one water generation estimate during the trip, generating a modified representation of the geographical area based on the at least one water generation estimate and the depiction of the geographical area, and communicating an instruction to present the modified representation at the display device.

13. A system for tracking water generation of a vehicle, the system comprising:
   a water generation apparatus disposed in the vehicle and configured to produce liquid water;
   a sensing device that detects an environmental condition of a geographical area associated with the vehicle;
   a display device configured to present a depiction of the geographical area;

at least one sensor that detects a capacity level of the water generation apparatus, the capacity level being one of a water generation rate and a water volume; and a controller in communication with the sensing device, the at least one sensor, and the display device, the controller configured to:

determine at least one water generation estimate for the water generation apparatus based on the environmental condition and the geographical area;

update the at least one water generation estimate based on the capacity level during a trip along a selected route;

modify the selected route between a starting point of the vehicle and a destination point of the vehicle without requiring manual selection of a modified route and in response to updating the at least one water generation estimate during the trip;

generate a modified representation of the geographical area based on the at least one water generation estimate and the depiction of the geographical area; and communicate an instruction to present the modified representation at the display device.

14. The system of claim 13, wherein the modified representation includes a map and a graphical overlay indicating the at least one water generation estimate, wherein the at least one water generation estimate includes a plurality of water generation estimates corresponding to a plurality of regions of the geographical area, and wherein the graphical overlay is segmented based on the plurality of regions.

* * * * *